US007787920B2

(12) United States Patent
Körner

(10) Patent No.: US 7,787,920 B2
(45) Date of Patent: Aug. 31, 2010

(54) DIPOLE ANTENNA FOR A PORTABLE COMMUNICATION DEVICE

(75) Inventor: Hans Peter Körner, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 657 days.

(21) Appl. No.: 11/738,708

(22) Filed: Apr. 23, 2007

(65) Prior Publication Data

US 2008/0261538 A1 Oct. 23, 2008

(51) Int. Cl.
*H04M 1/00* (2006.01)

(52) U.S. Cl. .................. 455/575.5; 455/553.1; 455/560

(58) Field of Classification Search ............. 455/554.1, 455/554.2, 575.5, 575.7
See application file for complete search history.

(56) References Cited

U.S. PATENT DOCUMENTS 6,718,157 B1 * 4/2004 Choi ......................... 455/3.01
7,151,955 B2 12/2006 Huber et al.
2006/0166719 A1 * 7/2006 Arad et al. ............... 455/575.2

FOREIGN PATENT DOCUMENTS

JP 2004-364149 12/2004
WO WO 99/54956 10/1999
WO WO 03/026342 A2 3/2003
WO WO 03/067702 A2 8/2003
WO WO 2005/122326 A1 12/2005
WO WO 2007/039071 A2 4/2007

OTHER PUBLICATIONS

International Search Report for PCT/EP2007/061340, mailed Feb. 7, 2008, 3 pages.

* cited by examiner

*Primary Examiner*—Nay A Maung
*Assistant Examiner*—Angelica M Perez
(74) *Attorney, Agent, or Firm*—Harrity & Harrity, LLP

(57) ABSTRACT

The present invention relates to a portable communication device arrangement comprising a main unit and an auxiliary unit. The main unit includes an electrical interface to an auxiliary unit, a ground plane dimensioned for antenna operation at a multiple of a quarter of a wavelength of a desired frequency, and a radio communication unit connected to the ground plane and to the electrical interface. The auxiliary unit comprises at least one electrical conductor to be connected to the electrical interface and including a first radio frequency trap, where the distance between the first radio frequency trap and an end of the conductor that is to be connected to the electrical interface corresponds to an odd multiple of a quarter of a wavelength of the desired frequency. The invention provides a good antenna through reuse of elements already provided in relation to a portable communication device.

11 Claims, 2 Drawing Sheets

DIPOLE ANTENNA FOR A PORTABLE COMMUNICATION DEVICE

TECHNICAL FIELD OF THE INVENTION

The present invention relates to antennas and, more particularly, to a portable communication device.

DESCRIPTION OF RELATED ART

Portable communication devices, such as cellular phones, tend to be provided with ever increasing ancillary functionality, for example, MP3 technology, camera arrangements, and radio reception. At the same time, such phones are being manufactured at increasingly smaller dimensions. Accordingly, phone manufacturers make continued efforts to place devices that provide such functionality in quite limited available space within the phone.

Additionally, an interest in receiving various types of radio signals exists. Receiving UHF radio signals, for instance, DVB-H mobile TV, often presents cell phone manufacturers with a number of challenges. Space is limited and cell phones often already have a number of built-in antennas, for instance, GSM and Bluetooth antennas. In some cases, additional antennas are present, such as WLAN and GPS antennas. Accordingly, additional space required for yet another antenna is limited, if not non-existent. Some solutions for built-in UHF antennas exist, but such antennas typically only provide low antenna gain or limited bandwidth. Proximity to the ground plane is also an issue with in-built antennas; when a phone is handheld by a user, performance is often degraded.

In the field of FM radio as it relates to cellular phones, space considerations have led to attempts to use a cord of an accessory, for instance, the cord of a portable hands-free device, as an antenna for the cellular phone, where the cellular phone is a main unit and the portable hands-free device is an auxiliary unit. The use of such a cord as an antenna, however, could be improved upon.

Implementations of the present invention provide an improved antenna solution for a portable communication device arrangement that includes a main unit and an auxiliary unit.

SUMMARY OF THE INVENTION

Implementations of the present invention provide an improved portable communication device arrangement.

According to a first aspect of the present invention, a portable communication device arrangement is provided, which arrangement comprises:

a main unit including:

- an electrical interface to an auxiliary unit,
- a ground plane dimensioned for antenna operation at a multiple of a quarter of a wavelength of a desired frequency, and
- a radio communication unit connected to the ground plane and to said electrical interface, and an auxiliary unit including

- at least one electrical conductor to be connected to the electrical interface and including a first radio frequency trap, wherein the distance between said first radio frequency trap and an end of the conductor that is to be connected to said electrical interface corresponds to an odd multiple of a quarter of a wavelength of said desired frequency.

A second aspect of the present invention is directed towards a portable communication device arrangement including the features of the first aspect, wherein the main unit includes a second radio frequency trap connected to the electrical interface and the radio circuit is connected between said second radio frequency trap and said electrical interface.

A third aspect of the present invention is directed towards a portable communication device arrangement including the features of the first aspect, wherein the radio circuit is connected to the electrical interface via a matching unit.

A fourth aspect of the present invention is directed towards a portable communication device arrangement including the features of the third aspect, wherein the matching unit is a capacitor.

A fifth aspect of the present invention is directed towards a portable communication device arrangement including the features of the third aspect, wherein the matching unit is a matching network.

A sixth aspect of the present invention is directed towards a portable communication device arrangement including the features of the first aspect, wherein the ground plane includes a main element and an extension element in order to be dimensioned for operation at said multiple of a quarter of a wavelength of said desired frequency.

A seventh aspect of the present invention is directed towards a portable communication device arrangement including the features of the first aspect, wherein a radio frequency trap is provided through ferrite beads provided for each conductor of the auxiliary unit.

An eighth aspect of the present invention is directed towards a portable communication device arrangement including the features of the first aspect, wherein a radio frequency trap is provided through a parallel resonant LC network provided for each conductor of the auxiliary unit.

A ninth aspect of the present invention is directed towards a portable communication device arrangement including the features of the first aspect, wherein at least one of the multiples is an odd multiple of a quarter of a wavelength of said desired frequency.

A tenth aspect of the present invention is directed towards a portable communication device arrangement including the features of the first aspect, wherein one conductor of the auxiliary unit is a shield and the radio communication unit is connected to this shield.

An eleventh aspect of the present invention is directed towards a portable communication device arrangement including the features of the first aspect, wherein the desired frequency lies in the UHF frequency range.

A twelfth aspect of the present invention is directed towards a portable communication device arrangement including the features of the first aspect, wherein the main unit is a portable communication device and the auxiliary unit is an accessory to this portable communication device.

A thirteenth aspect of the present invention is directed towards a portable communication device arrangement including the features of the twelfth aspect, wherein the portable communication device is a cellular phone and the accessory is a portable hands-free device.

Implementations of the invention have several advantages, for example, an antenna that is suitable for receiving UHF signals, such as digital television signals, but also radio, such as FM radio, having superior gain and bandwidth. Implementations are inexpensive and relatively easy to produce, in part, because components and units that are provided in existing portable communication devices and accessories may be utilized. In some implementations, the conductor associated with the auxiliary unit is extended in the process of being used by a user, which may enable superior antenna properties when, for instance, using the auxiliary unit while watching mobile TV.

It should be emphasized that the terms, "comprises/comprising" and "includes/including," when used herein, are intended to denote the presence of stated features, integers, steps or components, but do not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

A portable communication device arrangement will now be described in relation to a main unit that is a portable communication device in the form of a cellular phone, which may be a variation of such a unit. The portable communication device may include another type of device, such as a cordless phone, a PDA or any other type of portable device configured to communicate using radio waves. The portable communication device arrangement may include an auxiliary unit in the form of an accessory to the main unit. The accessory may include a portable hands-free device. However it is not limited to this type of device, but may include any auxiliary unit that electrically connects to the main unit, for example, via at a conductor.

Figure 1:
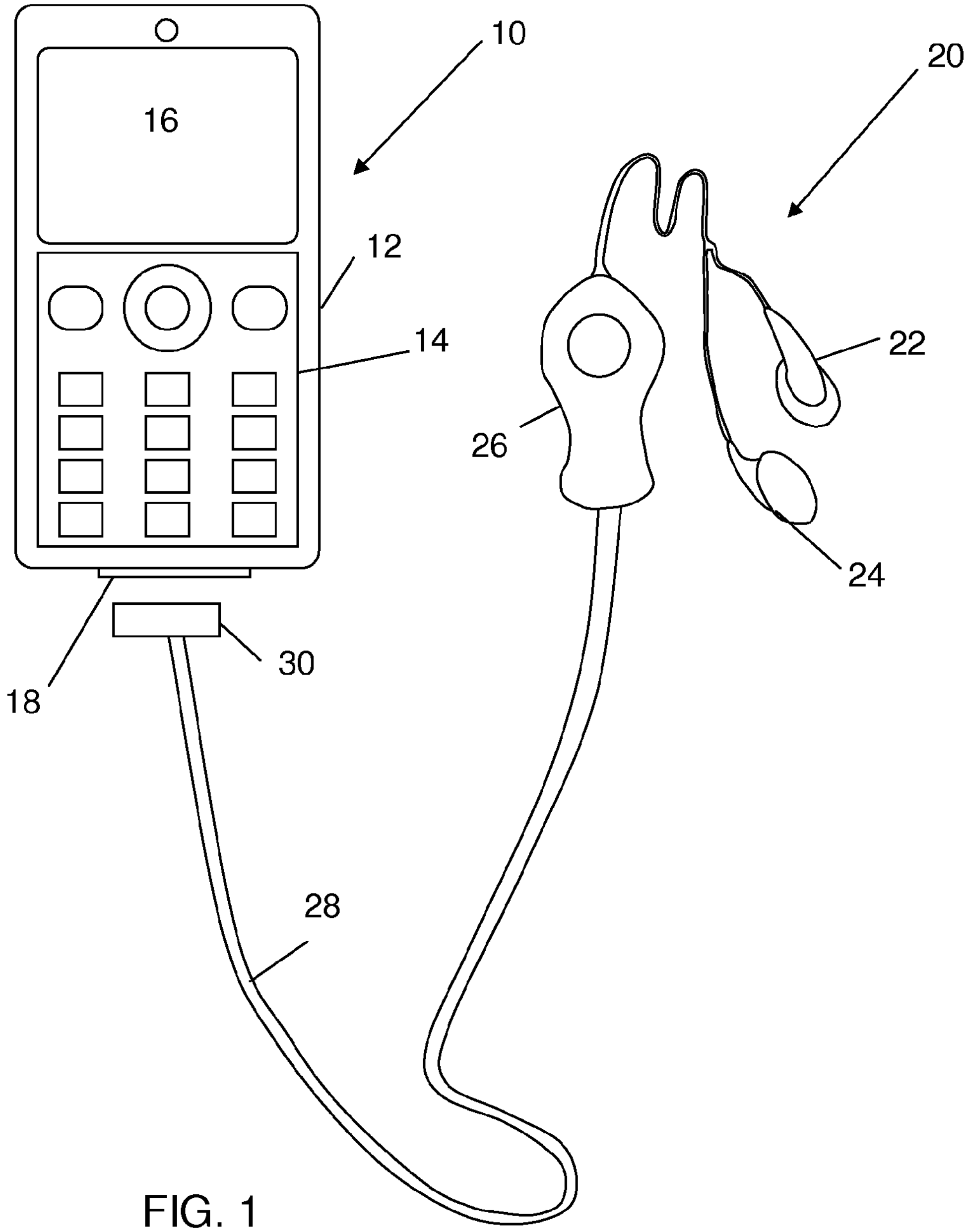
FIG. 1 schematically shows a front view of an exemplary communication device arrangement in which systems and methods described herein may be implemented.

FIG. 1 schematically shows a front view of a phone 10, which may include the main unit of the portable communication device arrangement according to one implementation. Phone 10 may include a casing 12, a keypad 14, and a display 16. Phone 10 may include an electrical interface to auxiliary units in the form of a system connector 18, which may be provided at a bottom end of phone 10. To system connector 18, a first auxiliary unit in the form of a portable hands-free device 20 may connect. Portable hands-free device 20 may include ear phones 22 and 24 for wearing by a user, as well as a central unit 26, which may include a microphone. To central unit 26, a cord 28 may connect, which in turn may connect to a plug 30 for insertion in system connector 18. Cord 28 may include a number of conductors, which may transport signals to and from microphone and ear phones 22 and 24 of portable hands-free device 20.

Figure 2:
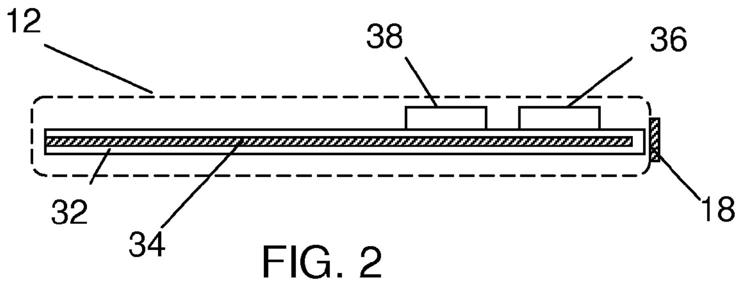
FIG. 2 schematically shows a cross-sectional side view of an exemplary circuit board associated a device in which systems and methods described herein may be implemented.

FIG. 2 shows a side view of a circuit board 32 that may be provided in casing 12 of phone 10. Casing 12 is shown as a dashed box and may include some of the elements of implementations of the present invention. On one side of circuit board 32 a radio communication unit 36 and a sound processing unit 38 may be provided, where radio communication unit 36 is arranged to receive radio frequency signals in one or more frequency ranges, which may include the UHF frequency range. Sound processing unit 38 may be arranged to process various audio signals for the microphone and ear phones 22, 24 of hands-free device 20. In a middle layer of circuit board 32 there may be provided a ground plane 34, which, in one embodiment of the present invention, may extend substantially entirely throughout circuit board 32.

Figure 3:
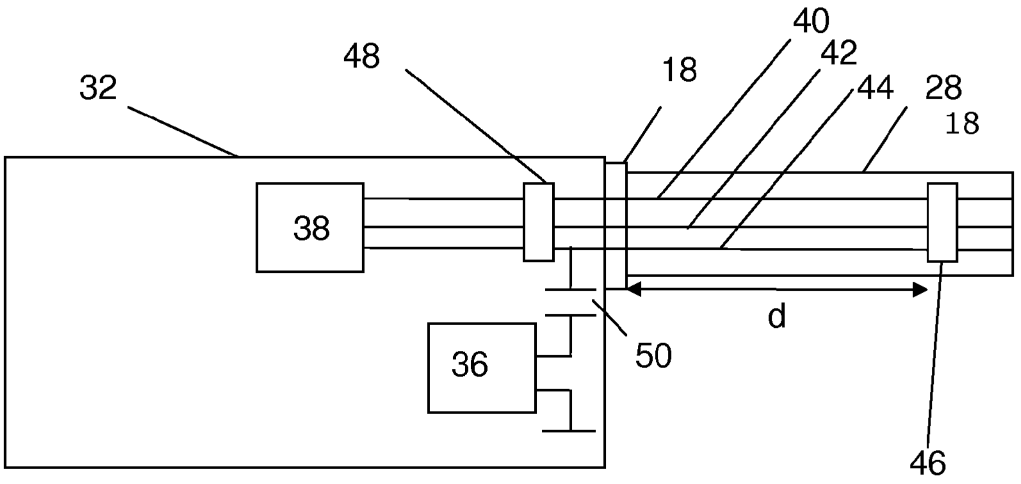
FIG. 3 schematically shows a front view of the circuit board of FIG. 2 together with relevant elements of an associated device in which systems and methods described herein may be implemented.

FIG. 3 schematically shows cord 28 with plug 30 connected to system connector 18, which are all shown as dashed boxes. FIG. 3 also shows some units of phone 10 that are relevant for the present invention. Cord 28 may include a first, a second, and a third conductor 40, 42, and 44, where third conductor 44 may act as a shield of cord 28. At a distance d from the connection point to system connector 18, a first radio frequency trap 46 may be provided in cord 28. Beyond first trap 48, cord 28 may have any desired length. This first radio frequency trap 48 is a trap that is effective for each of conductors 40, 42, 44 of cord 28, which will be described in more detail below. Conductors 40, 42, and 44 of cord 28 may mate when plug 30 is inserted in system connector 18, with corresponding conductors leading to sound processing unit 38. In the mating conductors, between sound processing unit 38 and system connector 18, a second radio frequency trap 48 may be provided. Second trap 48 may be provided as close as possible to system connector 18. Radio communication unit 36 may connect to one of the mating conductors, for example, the one that mates with third conductor 44 of cord 28, via a capacitor 50. Radio communication unit 36 may connect to ground plane 34.

According one embodiment, the part of conductors 40, 42, and 44 of cord 28 between system connector 18 and first radio frequency trap 46, which is here denoted active length d, may function as a first leg of a dipole antenna, while ground plane 34 may functions as the second leg of the dipole antenna. reasoning this regard, ground plane 34 may be dimensioned for antenna operation, i.e., for being most efficient, at a multiple of a quarter of a wavelength of a desired frequency within a frequency band that is of interest, which, in this example, may be a frequency in the UHF frequency band. The placing of first radio frequency trap 46 may be chosen so that distance d between the ends of conductors 40, 42 and 44 of cord 28 that connect to system connector 18 and the first radio frequency trap 46, i.e., active length d, is essentially equal to a multiple of a quarter of the same wavelength. In its simplest form, for example, the multiple associated with the active length and the multiple associated with ground plane 34 may be chosen as one, which means that both active length d and ground plane are dimensioned for a quarter of a wavelength of the desired frequency. Traps 46 and 48 may have dual functions. They may both stop radio signals received via cord 28 from influencing the signals provided to sound processing unit 38 and ear phones 22, 24 and the microphone of hands free device 20. First trap 46 may enable the first leg of the dipole antenna to have the chosen length d.

Each of radio frequency traps 46 and 48 may function as a parallel resonance circuit, i.e., like a capacitor and inductor connected in parallel, and thus filter out the radio frequency signals that are received by the antenna. Radio frequency traps 46 and 48 may be provided in the form of ferrite beads, one for each conductor in cord 28 and one for each mating conductor on circuit board 32. The ferrite beads may have a high impedance for the frequency of interest, for instance, UHF, and perhaps also for FM radio frequencies, but a low impedance for audio frequencies. A suitable ferrite bead, for example, may include the ferrite bead of the type, Murata BLM15HD182SN1, which has an impedance above 3.3 kΩ at UHF and about 1.8 kΩ at FM frequencies.

Capacitor 50, for example, may be a matching unit that will block any difference in DC levels between the audio signal and the antenna input, and can also provide impedance matching. This capacitor and its leads may be surrounded by a low capacitance area between radio communication unit 36 and conductors 40, 42, and 44 of cord 28. This may act to minimize RF losses. The capacitor can also be part of or replaced by an impedance matching network, which is thus another form of matching unit.

Implementations thus provide an antenna that may be suitable for receiving UHF signals such as digital television signals, but may also be applied to radio such as FM radio.

Implementations of the present invention have a number of advantages, for example, a superior gain (~2 dBi or ~0 dBd) and bandwidth, where no high Q tuning is needed. The impedance matching, which may be made around 50-75Ω, is incomplex. The antenna is inexpensive and simple to produce since it utilizes components and units that are present in existing portable communication devices and accessories. According to one implementation, the phone itself may be used as a part of the antenna, which is possible since it is electrically 'floating.' The cord of the hands-free device is normally naturally extended when in use. T his furthermore provides good antenna properties, when using the hands-free device while watching mobile TV. The hands-free device can furthermore still be used as radio antenna, for instance, for FM radio, if the RF trap in the cord is designed with suitable impedance at FM frequencies.

Figure 4:
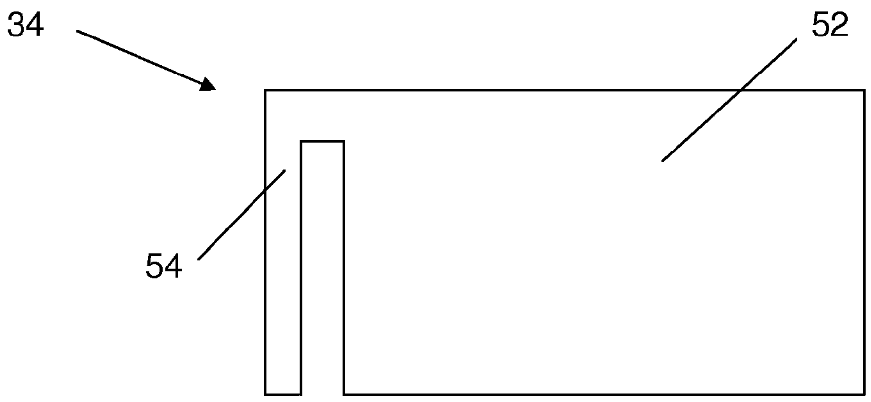
FIG. 4 schematically shows a variation of a ground plane that enables operation at a desired frequency.

In implementations in which the circuit board may not have sufficient size for dimensioning the ground plane to the desired multiple of a quarter of a wavelength of a desired frequency, an extension element may be provided, as is schematically shown in FIG. 4, which shows a ground plane having a main element 52, which is here rectangular, to which an extension element 54 is connected. Extension element 54 is here provided as an added bar-shaped element. It should be realized that extension element 54 may have any desired regular or irregular shape to provide an additional length of the ground plane. Extension element 54 may, for instance be curved or of meandering shape. Likewise, main element 52 may have any suitable shape.

The above-described implementations may be varied in a number of ways. For example, the active length of the cord and the ground plane may be dimensioned for different multiples of the same wavelength. Each may separately be dimensioned for both even and odd multiples. The second trap may be omitted, and as such, the audio signal processing may have to be designed for better noise handling. The traps may be provided in ways other than that described above. A trap may be provided as only an inductor provided in a conductor, only a capacitor provided in a conductor or as a parallel resonance LC circuit (capacitor in parallel with inductor) in a conductor. The capacitor via which the radio communication unit may connect to a conductor, may, as has been explained above, be omitted. The radio communication unit need not connect to a shield of the cord, but may connect to any of the conductors. It should be appreciated that the number of conductors can be varied and range, for example, from only one to several. Additional capacitors may connect between the conductors of the cord. Implementations have been described in relation to the UHF and the FM bands. Other radio frequency bands, for instance, VHF, are possible. The radio communication unit can be disposed anywhere relative to the circuit board. The electrical interface described above need not be provided in the form of a system connector. The electrical interface may include a separate connection, for instance, an ear phone jack. This electrical interface need not be disposed at the bottom of the phone, but may be disposed anywhere relative to the casing of the phone.

The invention is therefore only to be limited by the accompanying claims.

What is claimed is:

1. A communication system comprising:
a portable communication device including:
an electrical interface to couple to a hands-free device,
a ground plane dimensioned for antenna operation, as one leg of a dipole antenna, at a multiple of a quarter of a wavelength of a particular frequency, and
a radio communication unit to connect to the ground plane and the electrical interface; and
the hands-free device including:
a cord including:
at least one electrical conductor to carry electric signals,
a first end to connect to the electrical interface, and
a second end to connect to at least one of a microphone or a speaker, and
a first radio frequency trap, disposed in the cord at a distance d from the first end of the at least one electrical conductor, d being selected to correspond to a multiple of a quarter of a wavelength of the particular frequency, where the cord functions as another leg of the dipole antenna.

2. The communication system of claim 1, where the portable communication device further includes a second radio frequency trap to connect to the electrical interface, and a radio circuit connects to the second radio frequency trap and the electrical interface.

3. The communication system of claim 1, where the radio circuit connects to the electrical interface via a matching unit.

4. The communication system of claim 3, where the matching unit is a capacitor.

5. The communication system of claim 3, where the matching unit is a matching network.

6. The communication system of claim 1, where the ground plane comprises a main element and an extension element configured to operate at the multiple of a quarter of a wavelength of the particular frequency.

7. The communication system of claim 1, where the first radio frequency trap comprises ferrite beads associated with the at least one electrical conductor.

8. The communication system of claim 1, where the first radio frequency trap comprises a parallel resonant LC network associated with the at least one electrical conductor.

9. The communication system of claim 1, where at least one of the multiples is an odd multiple of a quarter of a wavelength of the particular frequency.

10. The communication system of claim 1, where the at least one electrical conductor comprises a shield and the radio communication unit connects to the shield.

11. The communication arrangement system of claim 1, where the particular frequency is in a UHF frequency range.

* * * * *